(12) United States Patent
Brockmann et al.

(10) Patent No.: US 9,492,890 B2
(45) Date of Patent: Nov. 15, 2016

(54) LASER MACHINING DEVICE

(75) Inventors: Rudiger Brockmann, Eberdingen (DE); Martin Huonker, Dietingen (DE)

(73) Assignee: TRUMPF Laser-und Systemtechnik GmbH, Ditzingen (DE)

( * ) Notice: Subject to any disclaimer, the term of this patent is extended or adjusted under 35 U.S.C. 154(b) by 467 days.

(21) Appl. No.: 13/983,803

(22) PCT Filed: Feb. 6, 2012

(86) PCT No.: PCT/EP2012/051950
§ 371 (c)(1),
(2), (4) Date: Oct. 9, 2013

(87) PCT Pub. No.: WO2012/107395
PCT Pub. Date: Aug. 16, 2012

(65) Prior Publication Data
US 2014/0021178 A1    Jan. 23, 2014

(30) Foreign Application Priority Data
Feb. 7, 2011 (DE) .......... 10 2011 003 686

(51) Int. Cl.
*B23K 26/067* (2006.01)
*G02B 6/35* (2006.01)
(Continued)

(52) U.S. Cl.
CPC ....... *B23K 26/0673* (2013.01); *B23K 26/0884* (2013.01); *G02B 6/3528* (2013.01); *G02B 6/32* (2013.01); *G02B 6/355* (2013.01); *G02B 6/4296* (2013.01)

(58) Field of Classification Search
CPC .......... B23K 26/0673; B23K 26/0884; G02B 6/3528; G02B 6/32; G02B 6/355; G02B 6/4296
See application file for complete search history.

(56) References Cited

U.S. PATENT DOCUMENTS 4,415,229 A * 11/1983 McCullough ........ G02B 6/3504
385/22
5,268,975 A * 12/1993 Yoshitani ............. B23K 26/067
385/16

(Continued)

FOREIGN PATENT DOCUMENTS

CN    1311448 A    9/2001
CN    2543085 Y    4/2003

(Continued)

OTHER PUBLICATIONS

German Office Action dated Jul. 12, 2011.
(Continued)

*Primary Examiner* — Geoffrey S Evans
(74) *Attorney, Agent, or Firm* — Fish & Richardson P.C.

(57) ABSTRACT

There is proposed a laser machining device (10) for a laser workpiece machining operation, having a laser (14) for producing laser radiation (50), and having at least two laser tools (18, 18'), to which the laser radiation (50) can be supplied by means of an optical-fiber cable (16). According to the invention, the optical-fiber cable (16) has an input-side end (20) having at least two optical fiber cores (22, 22') and a plurality of output-side ends (26, 26') each having one of the optical fiber cores (22, 22'), the optical fiber cores (22, 22') each being connected to one of the laser tools (18, 18'). A switching device (28) is preferably provided for selectively coupling the laser radiation (50) in one or more of the optical fiber cores (22, 22') of the optical-fiber cable (16).

15 Claims, 3 Drawing Sheets

(51) Int. Cl.
*B23K 26/08* (2014.01)
*G02B 6/32* (2006.01)
*G02B 6/42* (2006.01)

(56) References Cited

U.S. PATENT DOCUMENTS

| | | | |
|---|---|---|---|
| 5,430,816 A | 7/1995 | Furuya et al. | |
| 5,616,261 A * | 4/1997 | Forrest | B23K 26/023 219/121.63 |
| 6,078,716 A * | 6/2000 | Huang | G02B 6/02042 385/123 |
| 6,873,757 B2 * | 3/2005 | Li | G02B 6/3524 385/22 |
| 7,058,255 B1 * | 6/2006 | Fang | G02B 6/3524 385/16 |
| 8,934,742 B2 | 1/2015 | Voss et al. | |
| 9,128,252 B2 * | 9/2015 | Xu | G02B 6/3572 |
| 2003/0152312 A1 * | 8/2003 | Zhou | G02B 6/3524 385/16 |
| 2003/0185497 A1 * | 10/2003 | Zhou | G02B 6/3524 385/22 |
| 2004/0033037 A1 | 2/2004 | Suzuki et al. | |
| 2006/0249486 A1 * | 11/2006 | Rippl | B23K 26/067 219/121.63 |
| 2009/0108052 A1 * | 4/2009 | Feng | B23K 1/0016 385/33 |
| 2011/0075971 A1 * | 3/2011 | Elenbaas | G02B 6/3847 385/55 |
| 2011/0139759 A1 * | 6/2011 | Millman, Jr. | B23K 26/0621 219/121.72 |
| 2011/0224554 A1 * | 9/2011 | Vukeljic | G02B 6/3882 385/72 |
| 2012/0128294 A1 | 5/2012 | Voss et al. | |
| 2014/0300962 A1 * | 10/2014 | Hosokawa | B23K 26/08 359/484.03 |

FOREIGN PATENT DOCUMENTS

| | | |
|---|---|---|
| CN | 2567592 Y | 8/2003 |
| CN | 1487312 A | 4/2004 |
| DE | 2830261 A1 | 1/1980 |
| DE | 4213424 A1 | 10/1992 |
| DE | 19637885 A1 | 3/1997 |
| DE | 202006018356 U1 | 1/2008 |
| DE | 102009027348 A1 | 1/2011 |
| EP | 1380867 A2 | 1/2004 |
| EP | 1393848 A1 | 3/2004 |
| EP | 1591189 A1 | 11/2005 |
| JP | H0647574 A | 2/1994 |
| JP | 6-95174 A * | 4/1994 |
| JP | H0756028 A | 3/1995 |
| JP | H07185859 A | 7/1995 |
| JP | H08150485 A | 6/1996 |
| JP | 2001347389 A | 12/2001 |
| JP | 2003-211279 A * | 7/2003 |
| JP | 2008003419 A | 1/2008 |
| JP | 2010286548 A | 12/2010 |

OTHER PUBLICATIONS

International Search Report dated Jun. 26, 2012.
International Preliminary Report on Patentability dated Aug. 13, 2013.

* cited by examiner

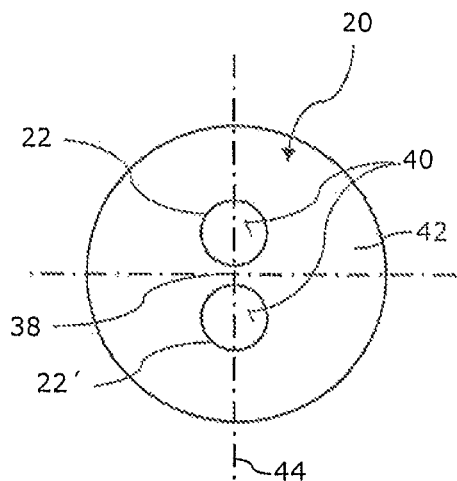
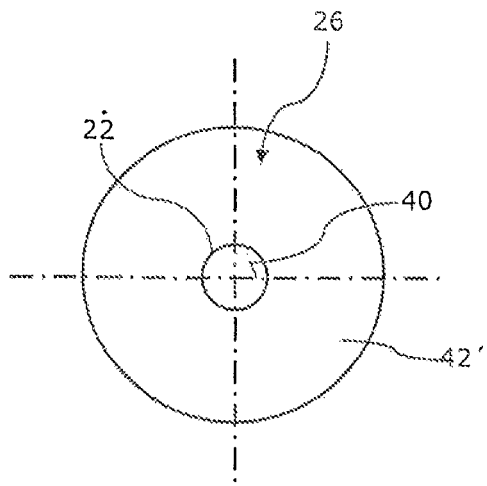
Fig. 2a　　　　　　　　Fig. 2b
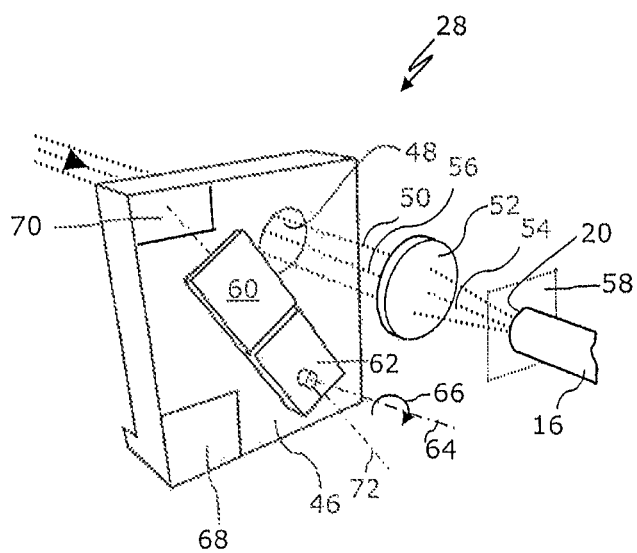
Fig. 3

LASER MACHINING DEVICE

This application is a national stage application of International Application No. PCT/EP2012/051950 (WO 2012/107395 A1), filed Feb. 6, 2012 which is herein incorporated by reference in its entirety.

BACKGROUND OF THE INVENTION

1. Field of the Invention

The invention relates to a laser machining device for a laser workpiece machining operation, having a laser for producing laser radiation, and having at least two laser tools, to which the laser radiation can be supplied by means of an optical-fibre cable.

2. Description of Related Art

EP 1 591 189 A1 disclosed, for example, a laser machining device of this type in which the laser radiation produced by the laser can be supplied to the individual laser tools by means of a plurality of optical-fibre cables which are connected thereto. The optical-fibre cables require in each case at the laser side separate connections which, owing to a respective cross-section of the optical-fibre cables or the connection plugs thereof, are arranged with a predetermined minimum spacing from each other. This does not promote a compact structural type. In addition, in particular when the optical-fibre cables are changed, there is produced considerable operational complexity and in practical terms a not inconsiderable risk of contamination, for example, of optical coupling faces of an optical fibre core of the individual optical-fibre cables, which can lead to occurrences of impairment of the power of the laser tools.

SUMMARY OF THE INVENTION

In this regard, an object of the present invention is to provide a laser machining device which is mentioned in the introduction and which overcomes the disadvantages of the prior art.

This object is achieved by a laser machining device for a laser workpiece machining operation. The device includes a laser for producing laser radiation, and at least two laser tools, to which the laser radiation can be supplied by means of an optical-fibre cable. The optical-fibre cable has an input-side end having at least two optical fibre cores and a plurality of output-side ends each having one of the optical fibre cores. The fibre cores are connected to one of the laser tools. A switching device may be provided for selectively coupling the laser radiation in one or more of the optical fibre cores of the optical-fibre cable.

An advantage connected with the laser machining device according to the invention is substantially that, owing to the single input-side end of the optical-fibre cable, only a single laser-side connection is required. A particularly compact and structurally simplified structure is thereby enabled. The handling of the laser machining device is also thereby generally simplified and the risk of contamination of input-side optical coupling faces of the fibre cores or a connection associated with the optical-fibre cable at the laser side is reduced. Connection-side malfunctions can thus also be prevented. The fibre cores of the optical-fibre cable are surrounded by a common cladding, whereby safe installation of the optical-fibre cable, substantially in the danger region of movable machine components of the laser machining device, is simplified. The optical-fibre cable may have a number of fibre cores which corresponds to the number of laser tools or have a number of fibre cores which exceeds the number of laser tools. In the latter case, a transmission of the laser radiation to the laser tools can be ensured, even in the event of damage to a fibre core of the optical-fibre cable. Undesirable downtimes of the laser machining device are minimised and cost-intensive replacement of the entire optical-fibre cable is prevented.

According to a preferred development of the invention, a laser switching device is provided for selectively coupling the laser radiation in one or more of the fibre cores of the optical-fibre cable. The laser radiation can thereby be supplied at a given time, if necessary in each case to one of the laser tools or also—with the laser radiation being split— simultaneously to a plurality of laser tools. This is advantageous with regard to workpiece machining times and the handling of the laser machining device. Furthermore, owing to the optical fibre cores of the optical-fibre cable which are located close beside each other at the input side, only very small adjustment paths, for example, of optical deflection means, are required for corresponding coupling of the laser radiation in the fibre cores. In addition, optical deflection means which are used can be constructed in a particularly compact manner. It is thereby possible to achieve particularly short switching times for the switching device, that is to say, a time necessary for control of a respective fibre core of the optical-fibre cable, and a generally compact structure of the switching device.

According to a preferred development of the invention there are provided connection means, by way of which the input-side end of the optical-fibre cable can be positioned in a defined position and in a defined rotation position with respect to the switching device. The optical fibre cores can thereby be arranged with the input-side optical coupling faces thereof together in an operationally optimised manner for coupling the laser radiation with respect to the switching device, for example, in a focal plane of a collecting lens. An adjustment of the laser switching device can also thereby be generally facilitated.

The connection means preferably have a connection socket which is arranged on the switching device and a connection plug which is arranged on the optical-fibre cable and which can be positioned in the connection socket. The input-side end of the optical-fibre cable can thereby be positioned in the predetermined position or in the predetermined rotation position with respect to the switching device in a reproducible and precise manner.

So that the laser radiation during operation of the laser machining device is not irradiated, for instance, owing to an undesirable change of the rotation position of the input-side end of the optical-fibre cable, into the cladding thereof, a torsion prevention device is preferably provided. The torsion prevention device is in this instance in particular configured in such a manner that a maximum torsion angle of the optical-fibre cable, and therefore of the optical fibre cores, with respect to the switching device of 0.3°, in particular 0.2°, is not exceeded.

The optical fibre cores preferably have input-side optical coupling faces, which are arranged on a transverse axis of the optical-fibre cable which intersects with a longitudinal axis of the optical-fibre cable. The optical coupling faces are intended in this instance to be understood to refer to either the input-side end faces of the optical fibre cores themselves, which end faces are in practice mostly precisely ground, or also end faces of guiding tubes which receive a respective fibre core of the optical-fibre cable in the connection plug of the optical-fibre cable (so-called ferrules) and optionally fix it with respect to the connection plug.

The input-side optical coupling faces of the optical fibre cores may in this instance in particular be arranged symmetrically with respect to the transverse axis. The optical-fibre cable can thereby have a respective required minimum cross-section, and the fibre cores are at the same time protected within the optical-fibre cable by means of a respective maximum spacing with respect to the cladding outer face. The known arrangement of the respective optical coupling faces of the individual fibre cores with respect to each other and the respective known size thereof further enable simplified adjustment of the laser switching device since the position of an end face of the fibre cores can be used as a reference variable for the control of the other fibre cores, that is to say, coupling of the laser radiation therein.

As long as the optical-fibre cable has an even plurality of optical fibre cores, the optical coupling faces thereof can in particular be arranged in pairs on respective transverse axes. The optical coupling faces of the fibre cores may also be arranged in a circular manner around the longitudinal axis of the optical-fibre cable.

In order to achieve the most efficient possible coupling of the laser radiation in the fibre cores of the optical-fibre cable, it has further been found to be advantageous for at least a portion of the optical fibre cores of the optical-fibre cable to have a different cross-section. In this instance, in particular an optical fibre core which is arranged in the optical-fibre cable radially further outwards with respect to the longitudinal axis thereof, may have a larger cross-section than a fibre core which is arranged radially further inwards. Tolerances of the individual fibre core diameters and positional deviations of the fibre cores in the optical-fibre cable or connection plug can thereby be compensated for in a simple manner.

The switching device preferably has optical deflection means for coupling the laser radiation in the optical fibre cores of the optical-fibre cable. The optical deflection means in this instance preferably comprise a wedge-like optical prism, a collecting lens, a holographic optical element, a diffractive optical element, a deflection mirror, a roof type mirror and/or a bevelled mirror.

Preferably, at least a portion of the optical redirection means can be pivoted about at least one, preferably two, adjustment axis/axes. The laser radiation can thereby be coupled into the individual fibre cores of the optical-fibre cable in a reliable manner regardless of a geometric arrangement of the input-side optical coupling faces thereof with respect to the switching device. Positional tolerances of the optical fibre cores or the input-side optical coupling faces thereof can also be compensated for in a simple and precise manner.

The use of the prism enables particularly simple and precise deflection of the laser radiation, with in particular very small deflection angles also being able to be produced. The laser radiation can thereby also be coupled into fibre cores of the optical-fibre cable arranged close beside each other in a loss-free manner or without relatively large losses. According to an embodiment, the prism may be (permanently) arranged in the beam path of the laser radiation. In this instance, the laser radiation may be coupled into the individual fibre cores of the optical-fibre cable by means of simple rotation of the prism about the adjustment axes thereof. This structural type is advantageous, for example, in an optical-fibre cable in which the fibre cores are arranged at the input-side end of the optical-fibre cable in a circular manner around the longitudinal axis of the optical-fibre cable.

In the structurally simplest case, the prism can be moved into the beam path of the laser radiation, in particular pivoted therein. The laser radiation, for example, in an optical-fibre cable having only two fibre cores, can thereby be deflected in a simple manner and coupled into another fibre core, respectively.

According to an embodiment, the prism is only partially arranged in the beam path of the laser radiation or can be moved only partially therein. The prism can thereby act as a beam splitter so that the laser radiation can be simultaneously coupled into at least two fibre cores of the optical-fibre cable, that is to say, can be supplied simultaneously to two laser tools.

The switching device preferably has a control unit in order to enable control of the switching device, which control is preferably integrated in an operational control unit of the laser machining device.

BRIEF DESCRIPTION OF THE DRAWINGS

Other advantages and advantageous embodiments of the subject-matter of the invention will be appreciated from the description, the claims and the drawings. The features mentioned above and those set out in greater detail below can also be used individually or together in any combination. The embodiment shown and described is not intended to be understood to be a definitive listing, but is instead of an exemplary nature to describe the invention. The Figures of the drawings show the subject-matter according to the invention in a highly schematic manner and are not intended to be understood to be drawn to scale. In the drawings:

FIGS. 2a, 2b are an end-face view of the input-side end of the optical-fibre cable (FIG. 2a) and an end-face view of an output-side end of the optical-fibre cable (FIG. 2b), respectively;

FIG. 3 shows a switching device of the laser machining machine according to FIG. 1 in a first switching state;

DETAILED DESCRIPTION

Figure 1:
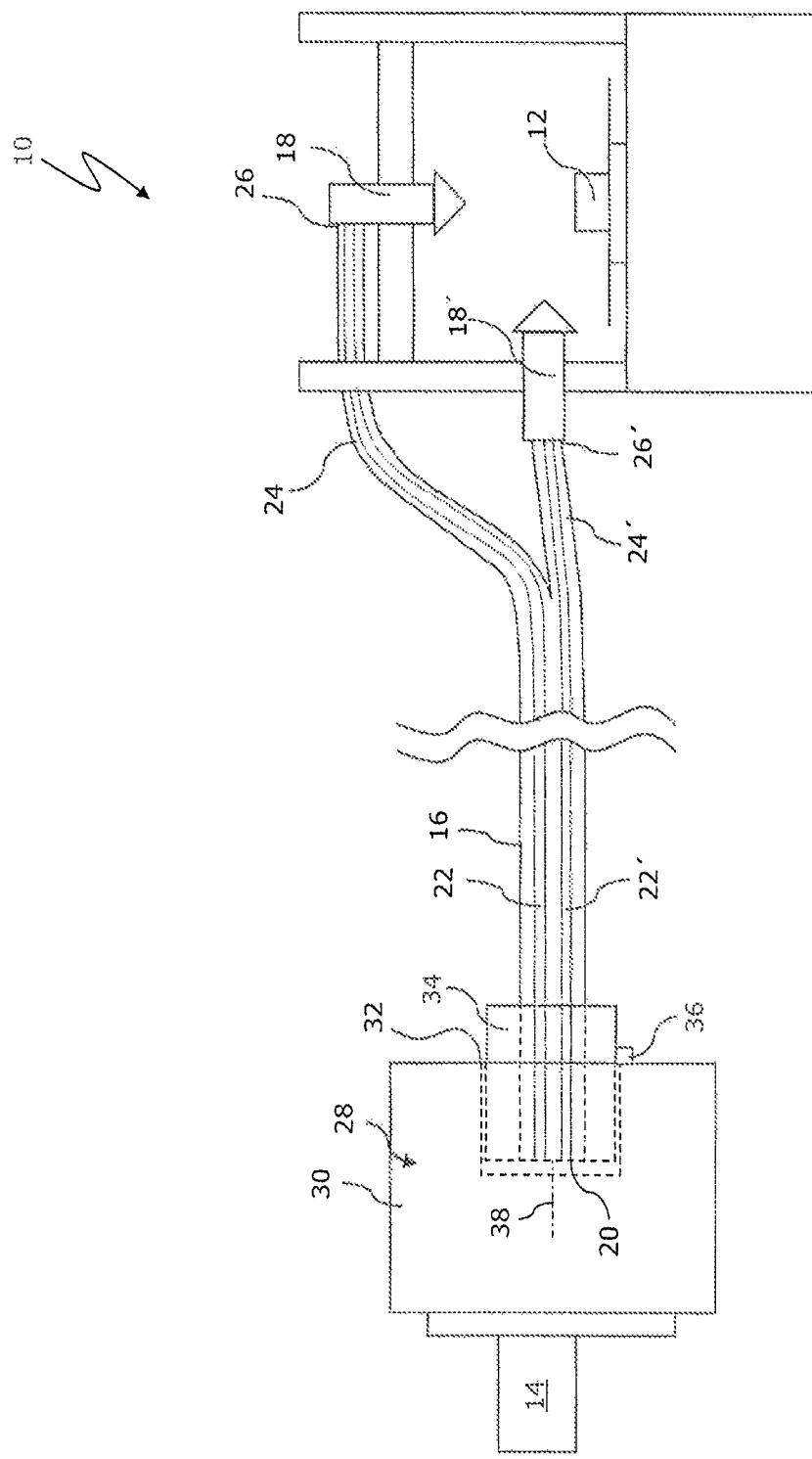
FIG. 1 is a perspective view of a laser machining device according to the invention having a laser for producing laser radiation, which can be supplied to two laser tools by means of an optical-fibre cable having two optical fibre cores.

FIG. 1 shows a laser machining device 10 for a laser machining operation of a workpiece 12. The laser machining device 10 has a laser 14 for producing laser radiation, which can be supplied to two laser tools 18, 18' by means of a substantially Y-shaped optical-fibre cable 16.

The optical-fibre cable 16 has an input-side end 20 having two optical fibre cores 22, 22', which are each illustrated with dashed lines. The optical-fibre cable 16 is branched in terms of its path into two optical-fibre cable branches 24, 24' and consequently has two separate output-side ends 26, 26' each having one of the optical fibre cores 22, 22'. The output-side ends 26, 26' or the optical fibre cores 22, 22' are each connected to one of the laser tools 18, 18'.

A switching device 28 which is arranged downstream of the laser 14 serves to selectively couple the laser radiation produced by the laser 14 into one of the optical fibre cores 22, 22' of the optical-fibre cable 16, respectively. The switching device 28 has a housing 30 having a connection socket 32 in which a connection plug 34 which is arranged at the input-side end 20 of the optical-fibre cable 16 is inserted. The connection plug 34 and the connection socket 32 cooperate in such a manner that the optical-fibre cable 16 with the input-side end 20 thereof can be positioned in a defined position and in a defined rotation position with respect to the switching device 28.

A torsion prevention device 36 serves to limit rotation of the input-side end 20 of the optical-fibre cable 16 arranged in the defined rotation position with respect to the switching device 28 to a maximum rotation angle of +/−0.03° with respect to the switching device 28 about the longitudinal axis 38 of the optical-fibre cable 16.

As can be seen from the end-face plan view of the input-side end 20 of the optical-fibre cable 16 shown in FIG. 2a (with the connection plug removed), the optical fibre cores 22, 22' of the optical-fibre cable 16 each have circular input-side end faces 40, which each form optical coupling faces for coupling the laser radiation. The end faces 40 of the fibre cores 22, 22' in this instance have the same cross-section. According to an embodiment which is not illustrated in greater detail in the drawings, the fibre cores 22, 22' may also have different cross-sections. The fibre cores 22, 22' are surrounded by a common cladding 42 of the optical-fibre cable 16 and arranged on a transverse axis 44 which intersects with the longitudinal axis 38 of the optical-fibre cable 16.

FIG. 2b is an end-face plan view of the output-side end 26 of the optical-fibre cable branch 24. The fibre core 22 is arranged centrally with its output-side end face 40 and surrounded by a coaxial cladding 42'.

In FIG. 3, the switching device 28 is illustrated without any housing. The switching device 28 has a substantially plate-like base member 46 having a through-opening 48 for the laser radiation 50. Between the through-opening 48 and the optical-fibre cable 16 there is arranged a collecting lens 52, whose optical axis 54 in this instance coincides with a central beam axis 56 of the laser radiation 50 discharged from the through-opening 48. The optical-fibre cable 16 is arranged with the input-side end 20 thereof in the predetermined position thereof in a rear focal plane 58 of the collecting lens 52. There is arranged on the base member 46 a wedge-like prism 60 which is secured at one end to a retention element 62. The prism 60 can be pivoted about a rotation axis 64 in the direction of the arrow designated 66 in the beam path of the laser radiation 50. To this end, the retention element 62 is arranged on a rotation shaft which is not shown for reasons of clarity. The rotation shaft can be actuated by means of an electric servo-motor 68, for the control of which a control device 70 is provided. The retention element 62 and consequently also the prism 60 which is secured thereto can additionally be pivoted about a second rotation axis 72 via fine adjustment means which are not shown in greater detail.

Figure 4:
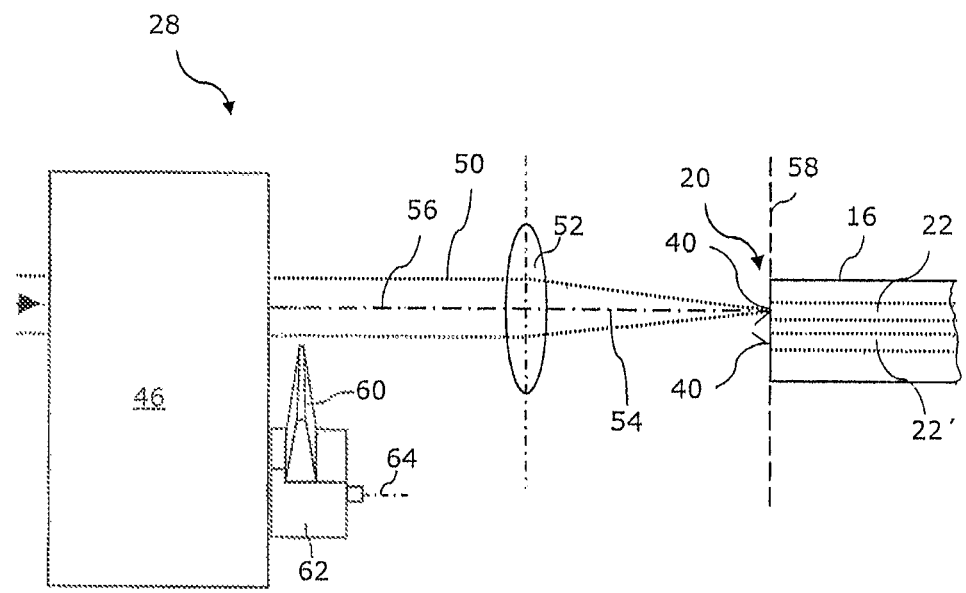
FIG. 4 is a side view of the switching device according to FIG. 3.

FIG. 4 is a side view of the beam path of the laser radiation 50 in the first switching state of the switching device 28. Both the end faces 40 of the two optical fibre cores 22, 22' of the optical-fibre cable 16 arranged in the focal plane 58 of the collecting lens 52 can be seen clearly. The input-side end face 40 of the upper optical fibre core 22 in FIG. 4 is arranged in the first switching state of the switching device 28 shown in this instance on the optical axis 54 of the collecting lens 52. The end faces 40 of the optical fibre cores 22, 22' are arranged vertically one above the other in the predetermined assembly position of the input-side end 20 of the optical-fibre cable 16 with respect to the switching device 28, that is to say, the transverse axis 44 (FIG. 2a) thereof extends substantially parallel with a device for deflecting the laser radiation 50 through the prism 60, which device is explained below in connection with FIG. 5.

Figure 5:
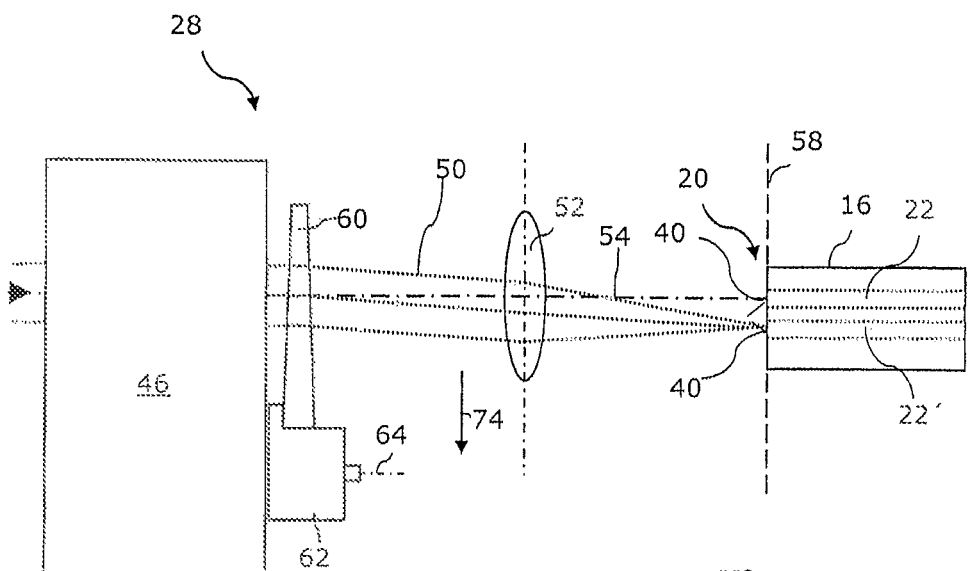
FIG. 5 shows the switching device according to FIG. 3 in a second switching state, in a side view similar to FIG. 4.

FIG. 5 shows a second switching state of the switching device 28, in which the prism 60 is pivoted about the first rotation axis 64 in the beam path of the laser radiation 50. The laser radiation 50 discharged from the prism 60 is deflected with respect to the optical axis 54 of the collecting lens 52 in a deflection direction 74 and focused by means of the collecting lens 52 in the focal plane 58 onto the end face 40 of the optical fibre core 22' of the optical-fibre cable 16.

The adjustment and the operation of the laser machining device 10 will be explained in greater detail below.

The connection plug 34 of the optical-fibre cable 16 is inserted into the connection socket 32 of the switching device 28. The two optical fibre cores 22, 22' of the optical-fibre cable 16 are in this instance, owing to the cooperation of the connection plug 34 and the connection socket 32, arranged with the input-side end faces 40 thereof in the focal plane 58 of the collecting lens 52 of the switching device 28 and additionally orientated with such a rotation position with respect to the switching device 28 that the end faces 40 are arranged one above the other along the transverse axis 44 (FIG. 2) and in the deflection direction 74 determined by the prism 60.

The switching device 28 is switched by means of the control device 70 into the first switching state thereof which is explained in connection with FIGS. 3 and 4 and in which the prism 60 is arranged outside the beam path of the laser radiation 50.

If the input-side end face 40 of the optical fibre core 22, for example, owing to positional tolerances of the optical fibre core 22 within the optical-fibre cable 16 or the connection plug 34, is not arranged precisely on the optical axis 54 of the collecting lens 52, the laser radiation is focused by means of adjustment of the switching device 28 onto the input-side end face 40 of the optical fibre core 22. This can be carried out in a manner not illustrated here in greater detail, for example, by means of controlled relative mutual displacement of the connection socket 32, the collecting lens 52 and/or the central beam axis 56 of the laser radiation 50, until the input-side end face 40 of the optical fibre core 22 comes to rest on the optical axis 54 of the collecting lens 52. Alternatively, the collecting lens 52 can also be accordingly readjusted (rotated) with respect to the laser radiation 50.

In another step, the output-side ends 26, 26' of the two light conductor cable branches 24, 24' of the laser light cable 16 are connected to the associated laser tool 18, 18', respectively.

Subsequently, the switching device 28 is moved by means of the control device 70 into the second switching state explained in connection with FIG. 5 in that the prism 60 is pivoted by means of an actuation of the servo-motor 68 about the rotation axis 64 into the beam path of the laser radiation 50.

With sufficiently precise arrangement of the other optical fibre core 22', the laser radiation 50 is now focused by means of the collecting lens 52 precisely on the input-side end face 40 of the other fibre core 40 of the optical-fibre cable 16 arranged in the focal plane 58 of the collecting lens 52, that is to say, is coupled therein.

In the case of an azimuthal positional deviation of the fibre core 22' with respect to the deflection direction 74 of the prism 60, it is finely adjusted by means of the rotation thereof about the adjustment axis 72 to the extent that the laser radiation 50 is precisely focused on the end face 40 of the second optical fibre core 22'.

After such an adjustment of the switching device 28, the laser radiation 50 can now be coupled by means of a change of the respective switching state of the switching device 28, if necessary, into one or other optical fibre core 22, 22' of the optical-fibre cable 16 and can consequently be supplied to one or other laser tool 18, 18' of the laser machining device 10.

What is claimed is:

1. A laser machining device comprising:
   a laser for producing laser radiation;
   at least two laser tools; and
   an optical-fiber cable configured to supply the laser radiation to the at least two laser tools, the optical-fiber cable comprising:
      an input-side end having at least two optical fiber cores;
      a common cladding configured to surround the optical fiber cores at the input-side; and
      a plurality of output-side ends each having one of the optical fiber cores and being connected to one of the laser tools; and
   a switching device configured to selectively couple the laser radiation in one or more of the optical fiber cores of the optical-fiber cable.

2. The laser machining device of claim 1, further comprising a connector through which the input-side end of the optical-fiber cable is positioned in a defined position and in a defined rotation position with respect to the switching device.

3. The laser machining device of claim 2, wherein the connector comprises:
   a connection socket arranged on the switching device; and
   a connection plug arranged on the optical-fiber cable and positioned in the connection socket.

4. The laser machining device of claim 2, wherein the connector is configured to limit a rotation of the input-side end of the optical-fiber cable relative to the switching device.

5. The laser machining device of claim 4, wherein the connector is configured such that a maximum torsion angle of the optical-fiber cable with respect to the switching device is no more than 0.3°.

6. The laser machining device of claim 5, wherein the maximum torsion angle is no more than 0.2°.

7. The laser machining device of claim 1, wherein the optical fiber cores each have an input-side optical coupling face arranged on a transverse axis of the optical-fiber cable that intersects with a longitudinal axis of the optical-fiber cable.

8. The laser machining device of claim 7, wherein the input-side optical coupling faces of the optical fiber cores are arranged symmetrically with respect to the transverse axis of the optical-fiber cable.

9. The laser machining device of claim 1, wherein the at least two optical fiber cores have a same cross-section.

10. The laser machining device of claim 1, wherein the at least two optical fiber cores have different cross-sections.

11. The laser machining device of claim 1, wherein the switching device comprises an optical deflector.

12. The laser machining device of claim 11, wherein the optical deflector includes at least one of a prism, a collecting lens, a holographic optical element, a diffractive optical element, a redirection mirror, a roof type mirror, or a bevelled mirror.

13. The laser machining device of claim 11, wherein the optical deflector comprise a prism configured to be moved into a beam path of the laser radiation.

14. The laser machining device of claim 13, wherein the prism is configured to be pivoted into the beam path of the laser radiation.

15. The laser machining device of claim 14, wherein the prism is configured to be pivoted about at least one adjustment axis.

* * * * *